United States Patent
Braden

[15] 3,677,230
[45] July 18, 1972

[54] FISH FOOD FEEDING APPARATUS

[72] Inventor: Alvin H. Braden, 130 Haverhill, San Antonio, Tex. 78228

[22] Filed: Sept. 9, 1970

[21] Appl. No.: 70,820

[52] U.S. Cl. .................................119/51, 119/56 A, 119/53.5
[51] Int. Cl. .......................................................A01k 61/02
[58] Field of Search.....................119/51, 53.5, 5, 3, 70, 54, 119/56, 56 A

[56] References Cited

UNITED STATES PATENTS

| | | | |
|---|---|---|---|
| 3,487,433 | 12/1969 | Fleming | 119/53.5 X |
| 1,016,637 | 2/1912 | Kraxberger et al. | 119/70 |
| 1,104,701 | 7/1914 | Parks | 119/70 |
| 1,112,068 | 9/1914 | Keller | 119/70 |
| 1,253,002 | 1/1918 | Collins | 119/70 |
| 1,498,220 | 6/1924 | Winkler | 119/70 |
| 2,972,334 | 2/1961 | Braden | 119/51 R |
| 3,515,098 | 6/1970 | Thurmond | 119/51 R |

*Primary Examiner*—Aldrich F. Medbery
*Attorney*—Kimmel, Crowell & Weaver

[57] ABSTRACT

A hopper for holding a supply of fish food to be dispensed therefrom by the force of gravity, and including a normally closed valve means disposed in the food dispensing path, the valve means being operable for movement to its open position to effect the dispensing of the fish food from the hopper upon forceable engagement thereof by a fish.

9 Claims, 3 Drawing Figures

Patented July 18, 1972
3,677,230
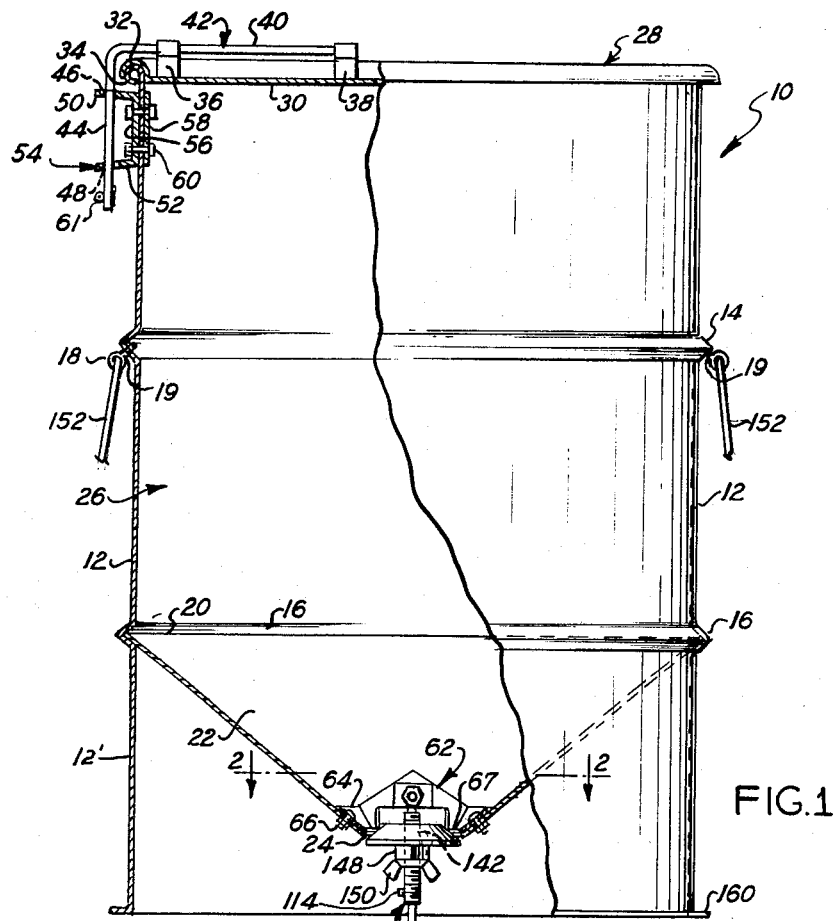
FIG. 1
FIG. 2
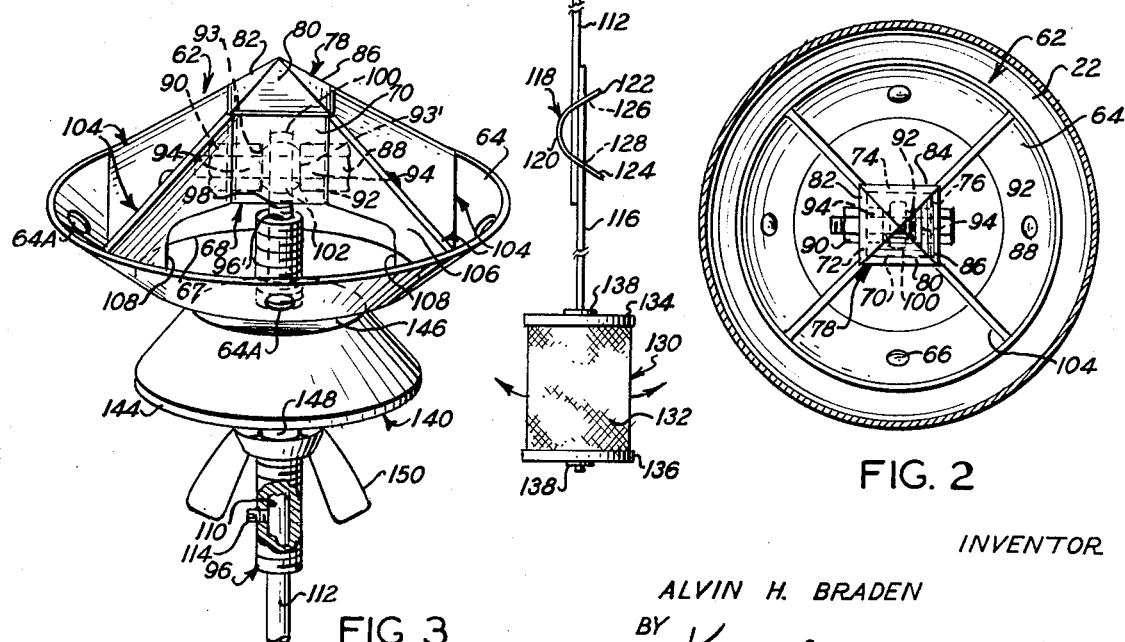
FIG. 3
INVENTOR.
ALVIN H. BRADEN
BY Kimmel, Crowell & Weaver
ATTORNEYS

FISH FOOD FEEDING APPARATUS

BACKGROUND OF THE INVENTION

1. Field of the Invention

In accordance with the present classification of inventions as established by the United States Patent Office, it is believed that this invention pertains to animal husbandry (Class 119) and, more specifically, to a feeding device (Subclass 51).

2. Description of the Prior Art

Animal operated feeding devices are old and well known in this art and, perhaps, the most pertinent prior art comprises applicant's own U.S. Pat. No. 2,972,334, entitled "WILDLIFE FEEDER," and which issued Feb. 21, 1961. The patented invention relates to a dispenser for dispensing limited quantities of an appropriate food to provide for the feeding of birds, fish, animals and all kinds of wild life, and the present invention constitutes an improvement thereover.

SUMMARY OF THE INVENTION

This invention pertains to the provision of apparatus for feeding, primarily, fish, and contemplates the provision of a refillable fish food containing hopper which may be suspended above a body of water and which includes a normally closed pendulum operated valve means disposed in the food dispensing path and which is moved to its open position upon engagement of the pendulum by a fish. In effect, the apparatus according to this invention is a "self-feeder" for fish.

This invention utilizes the valving means in order to limit the quantity of fish food to be dispensed and is operable for movement to its open position only upon the engagement of the valve operating means by the body of a fish.

Since fish do not feed at regular intervals, nor do they eat the same amount of food at all times, the feeding apparatus of this invention will offer fish food at any time the valve actuating means is operated and thereby eliminates the waste of food at those times the fish do not feed.

This invention also proposes the provision of apparatus of the type generally referred to supra, the apparatus including means for adjusting the rate of the discharge of the fish food from the hopper, and to provide a fish operated feeding device which is non-complex in construction and assembly, inexpensive to manufacture and maintain, and which is rugged and durable in use.

Other and further objects and advantages of the instant invention will become more manifest from a consideration of the following specification when read in the light of the annexed drawing.

BRIEF DESCRIPTION OF THE DRAWING

FIG. 1 is a side elevational view, partly broken away, of a fish feeding device constructed in accordance with this invention;

FIG. 2 is an enlarged partial cross-sectional view taken substantially on the horizontal plane of line 2—2 of FIG. 1, looking in the direction of the arrows; and FIG. 3 is a perspective view of the dispensing valve control mechanism for the hopper of the device or apparatus.

DESCRIPTION OF THE PREFERRED EMBODIMENT

The fish feeding apparatus or device constructed in accordance with the teachings of this invention is generally designated, in the drawing, by reference numeral 10.

As is seen in the drawing, the apparatus 10 includes a substantially hollow cylindrical side wall having a pair of opposed upper and lower ends. The side wall 12, intermediate the ends thereof, may be formed with upper and lower outwardly expressed corrugations 14, 16, respectively, and to serve a function to be described below, a plurality of annular eye-bolts 18 have the outer ends of their respective stems 19 fixedly secured (by conventional means) to the upper corrugation 14.

The base end 20 of a substantially hollow metallic inverted frusto-conical bottom wall is inserted in the concave side of the lower corrugation 16, the apex end of the bottom wall 22 extending towards but being spaced inwardly from the lower end of the side wall 12.

The apex end of the bottom wall 22 is formed with a normally horizontal opening 24 which extends transversely therethrough substantially in the plane of its frustum. The bottom wall 22 taken together with that portion of the side wall 12 which extends thereabove forms a substantially hollow hopper 26 which is adapted to receive fish food therein which is adapted to be discharged or dispensed under the force of gravity through the opening 24 in controlled quantities. The means for effecting this control will be described below.

The upper end of the hopper 26 is provided with a removable closure member 28 which, in the illustrated embodiment, takes the form of a discoidal plate 30 which, at its peripheral marginal edge is formed with an upwardly projecting downwardly opening arcuate flange 32 which is adapted to sealingly engage over the cylindrical rim 34 formed at the upper end of the side wall 12.

On a given radius, a pair of blocks 36, 38 are fixedly secured to the outer side of the plate 30 and project laterally and upwardly therefrom. Conventional means (not shown) connect the leg portion 40 of a substantially L-shaped handle on the blocks 36, 38, the leg portion 40 having an end spanning across the upper side of the arcuate flange 32 and which is bent downwardly to form a foot section 44 for the handle 42. The foot section 44 is slidably and releasably engaged within openings 46, 48 which extend transversely through the arms 50, 52 of a U-shaped bracket 54. As is seen in FIG. 1 of the drawing, the arms 50, 52 project laterally and outwardly from a bracket bight portion 56, and the latter is secured to the exterior side wall 12 and to a reinforcing bar 58 as by bolts 60.

The foot section 44 of the handle 42 is of such length that when the handle 42 is raised to disengage the flange 32 from its associated rim 34 the foot section 44 does not become disengaged from the arms 50, 52. To ensure that the foot section 44 does not become disengaged from the arms 50, 52, a cotter pin 61 is provided, the pin 61 extending transversely through the lower end of the foot section 44, as is shown in FIG. 1. After the plate 30 has been raised it may be pivoted, with the foot section 44, to either side of the side wall 12 in order to enable the operator to inspect or refill the hopper 26.

The control means for controlling the rate of flow of the feed from the hopper 26 through the opening 24 bears the general reference numeral 62. As is shown in the several Figures of the drawing, the control means 62 is seen to comprise an inverted substantially hollow metallic support band 64 which is telescopically engaged and superimposed on marginal areas immediately adjacent the opening 24. The band 64 is secured on the bottom wall 22 by conventional fastening means 66 extended through openings 64A which may take the form of nuts and bolts. An opening 67 in the band 64 is coaxial with the opening 24 in the bottom wall 22.

At 68 is indicated a normally upright substantially hollow rectangular housing having opposed closed and open upper and lower ends, respectively. The housing 68 includes the four side walls 70, 72, 74, 76 with each side wall of each pair thereof being disposed at right angles with respect to one another, and the upper end of the housing 68 is closed by a pyramidal closure cap 78 formed of a plurality of triangular panels 80, 82, 84, 86 having their base ends fixedly connected to the upper ends of the side walls 70, 72, 74, 76, respectively, and converging apices. The pyramidal cap serves a function to be described.

A bolt 88 extends transversely across the housing 68, and is supported on the side walls 72, 76. The bolt 88 is secured in its position as by a conventional nut 90. The bolt 88 extends diametrically through a ball 92 having opposed planar sides 93, 93'. Spacer nuts 94 are threaded on the bolt 88 inwardly of the housing 68 and engage the remotely positioned planar sides 93, 93' of the ball 92 to prevent its shifting relative to the longitudinal axis of the bolt 88, and to hold the ball substantially centrally of the side walls 70, 72, 74 and 76.

Reference numeral 96 designates an elongated externally threaded rod having a longitudinally extending internal bore 96' at its upper end which is tapped to receive the threaded stud 98 having an enlarged flattened outer end forming a head 100. The head 100 is formed with a transverse opening 102 to provide a socket in which the ball 92 is received. The ball 92 and the head 100 cooperate to form a conventional ball and socket connection between the bolt 88 and the rod 96.

The housing 68 is supported on the band 64 by means of a plurality of substantially L-shaped braces 104. The inner end of each of the legs 106 of each brace 104 is fixedly connected, by conventional means (not shown), to a corner of the housing 68, and the other ends of each of the legs 106 project away therefrom on transverse diagonals thereof. Each of the legs 106 terminates in a downwardly turned foot 108 which is rigidly connected by conventional means (not shown) to the inner side of the support band 64.

With the control means 62 constructed as described above, and with the support band 64 secured in its described position, the rod 96 will depend through the aligned openings 24, 67 in coaxial relationship relative thereto.

The lower end of the rod 96 which extends through the aligned openings 24, 67 is formed with a longitudinally extending bore 110 in which is slidably and removably disposed the upper end of a pendulum arm 112. The pendulum arm 112 and the rod 96 are releasably connected together as by a set screw 114. Superimposed against the lower end of the pendulum arm 112 is the upper end of a pendulum arm extension member, and the arm 112 and its extension member 116 are held in adjusted positions relative to their respective longitudinal axes as by the flexible spring clip means 118. The spring clip means 118 includes a bowed bight portion 120 from the ends of which laterally project arms 122, 124 having openings 126, 128 formed therein, respectively, and through which the lower portion of the pendulum arm 112 and the upper portion of the pendulum arm extension member 116 may slidably and adjustably pass.

Reference numeral 130 indicates an axially elongated substantially hollow wire mesh cylinder having a wire mesh axially elongated side wall 132 provided with upper and lower closure plates 134, 136, respectively. The lower end of the extension member 116 extends through the cylinder 130 and through the closure plates 134, 136. Conventional push-on fasteners 138 secure the wire mesh cylinder 130 on the lower end of the pendulum arm extension member 116.

The control means 62 further includes an upright frustoconical block 140 having an internal smooth bore 142. The bore 142 extends axially of the block 140 and opens in the plane of its base end 144 and upper end 146 disposed in the plane of the frustum. The block 140 is mounted on the rod 96, the rod being received through the bore 142 and projects beyond both ends thereof. As is seen in FIG. 1 of the drawing, the block 140 is adapted for extension through the openings 24, 67, and the base end thereof is provided with a diameter substantially equal to the diameters of the openings 24, 67.

Following the block 140 downwardly on the rod 96 is an adjustment nut 148. This nut is abutted by the block 140, the nut holding the block in a preselected position relative to the longitudinal axis of the rod 96. A wing lock nut 150 follows the nut 148 downwardly on the rod 96 and holds the latter against accidental or inadvertent displacement.

In operation, the hopper 26 is filled with a suitable fish food and wires 152 or other suitable connectors are engaged with the annular eye-bolts 18 and connected to any suitable platform or base support (not shown) whereby the apparatus 10 may be suspended above a body of water with the wire mesh cylinder submerged therein. By adjusting the extension member 116 relative to the pendulum arm 112 the wire mesh cylinder 130 may be submerged to any desired depth. Being of wire mesh having sizeable openings formed therein, the cylinder 130 offers but very little resistance to water passing therethrough, but at the same time, the cylinder offers an ample surface for fish to contact to actuate the pendulum arm.

For the purpose of stabilizing the apparatus 10 on its platform or base support, the lower end of the side wall 12 is provided with an outwardly flaring annular flange 160.

With the apparatus 10 suitably suspended over the body of water, and with the wire mesh cylinder submerged to the desired depth, the block 140 and the nuts 148, 150 are adjusted axially on the rod 96 so that sufficient clearance is provided between the block 140 and the openings 24, 67 so as to permit fish food to be dispensed through the openings upon the swinging of the pendulum arm 112 and its extension member 116 as a consequence of the contact of a fish body against the wire mesh cylinder 130. Such contact will cause the block 140 to swivel and to tilt downwardly a portion thereof opposite the direction of the force applied to the cylinder 130 thereby increasing the opening between the side of the block 140 and the openings 24, 67 to enable the fish food to be dispensed from the hopper 26 at a controlled rate. It will be understood, however, that while the block 140 is normally spaced from the side walls of the openings 24, 67, the annular passage formed therebetween is not of sufficient size so as to permit the fish food to freely pass therethrough in the absence of the actuation of the pendulum arm 112. Such an adjustment constitutes an economical control over the food dispensing.

The pyramidal closure cap 78 prevents a buildup of fish food on the upper end of the housing 68 and also functions to prevent potential food chokes. The cap 78 has further importance in that it prevents the fish food from entering the housing 68 and entering the ball 92 and socket 102 joint connection thereby rendering it inoperative or causing unusual wear leading to frequent replacement of parts.

That part of the side wall 12 which depends below the bottom wall 22 forms a hollow cylindrical skirt 12' that protects the valve control means 62 from inclement weather such as, for example, rain, snow, sleet, et cetera. When the apparatus 10 is not in use and is being stored, the set screw 114 is loosened and the pendulum arm 112 is disconnected from the rod 96.

Having described and illustrated one embodiment of this invention in detail, it will be understood that the same is offered merely by way of example, and that this invention is to be limited only by the scope of the appended claims.

What is claimed is:

1. Fish food feeding apparatus comprising:
    a substantially hollow normally upright cylindrical side wall adapted to be located over the upper surface of a body of water;
    closure means extending transversely across said side wall comprising a bottom wall that extends downwardly from the side wall to an opening that extends transversely through the bottom wall;
    said bottom wall and that portion of said side wall extending thereabove cooperating to form a hopper to receive fish food therein to be dispensed under the force of gravity through said opening;
    support means disposed in said hopper above said opening;
    a frusto-conical valve block whose base has a diameter substantially equal to the diameter of the opening but spaced therefrom, said valve block being movably and tiltably mounted to said support means and lying within said opening to define a food control means, the space between the periphery of the block and the periphery of the opening being such as to preclude the flow of food through said space when the block is centrally located in said opening and to permit the flow of food through said opening when the block is offset in said opening; and
    an elongated pendulum arm connected to and extending downwardly of said valve block and having an element on its lower end adapted to be submerged in said body of water to enable a fish to make a contact with the element to thereby cause the valve block to be offset in said opening.

2. Fish food feeding apparatus as defined in claim 1 further comprising: ball and socket means connecting the upper end of said pendulum arm on said support means to form said tiltable mounting of the valve block to the support means, said pendulum arm extending downwardly of said ball and socket means through said opening and through the valve block; and
   means on said pendulum arm for preventing the downward movement of said block from a preselected adjusted position on said pendulum arm.

3. Fish food feeding apparatus as defined in claim 2 wherein:
   said support means includes a housing surrounding said ball and socket means at its sides; and
   a closure cap extending across the upper end of said housing in vertically spaced relationship relative to said ball and socket means.

4. Fish food feeding apparatus as defined in claim 3 wherein:
   said housing comprises a plurality of normally upright connected side walls; and
   said closure cap has a substantially pyramidal configuration and being formed of a plurality of substantially triangular panels.

5. Fish food feeding apparatus as defined in claim 4 wherein:
   said support means further includes an inverted substantially hollow frusto-conical support band superimposed on the inner side of said bottom wall adjacent its said opening;
   said support band having an opening formed therein substantially in the plane of its frustum and being aligned with said opening formed in said bottom wall, said last named openings having substantially identical diameters; and
   brace means extending between and connected on said support band and said housing to hold said housing in a substantially centrally located position relative to said support band.

6. Fish food feeding apparatus as defined in claim 5 and:
   means connecting said support band on said bottom wall; and
   means releasably connecting said pendulum arm with said ball and socket joint connection.

7. Fish food feeding apparatus as defined in claim 1 wherein:
   a portion of said side wall projects downwardly beyond said bottom wall to comprise a skirt surrounding said valve block to protect the latter from inclement weather.

8. Fish food feeding apparatus as defined in claim 11 wherein:
   said bottom wall has an inverted frusto-conical configuration with the base end thereof fixedly connected on said side wall; and
   said opening formed in said bottom wall being disposed substantially at the plane of its frustum.

9. Fish food feeding apparatus as defined in claim 11 wherein:
   said element comprises an elongated substantially hollow wire mesh cylinder having large openings therein in order to offer a minimum resistance to the passage of water therethrough.

* * * * *